United States Patent [19]

Kawanami

[11] Patent Number: 4,631,241
[45] Date of Patent: Dec. 23, 1986

[54] RETAINER TYPE LEAD-ACID BATTERY

[75] Inventor: Yoshiharu Kawanami, Kyoto, Japan

[73] Assignee: Japan Storage Battery Company Limited, Kyoto, Japan

[21] Appl. No.: 758,007

[22] Filed: Jul. 23, 1985

[30] Foreign Application Priority Data

Jul. 23, 1984 [JP] Japan ............... 59-153583

[51] Int. Cl.⁴ .................. H01M 4/56; H01M 4/62
[52] U.S. Cl. .................... 429/225; 429/232
[58] Field of Search .................... 429/225, 232

[56] References Cited

U.S. PATENT DOCUMENTS

| | | | |
|---|---|---|---|
| 3,751,301 | 8/1973 | Kilduff | 429/232 X |
| 4,383,011 | 5/1983 | McClelland et al. | 429/225 X |
| 4,507,372 | 3/1985 | Rowlette | 429/232 X |

Primary Examiner—Brian E. Hearn
Assistant Examiner—Stephen J. Kalafut
Attorney, Agent, or Firm—Sughrue, Mion, Zinn, Macpeak and Seas

[57] ABSTRACT

A retainer type lead-acid battery having an electrolyte impregnated and retained only in a separator and positive and negative active materials, the battery having an improved high discharge rate performance at low temperatures. In accordance with the invention, the separator is made of chopped glass fibers having an average diameter of no more than 5.0 microns. The battery is fabricated such that applied pressure to an assembled element in the dry state prior to electrolyte filling is kept at a pressure of 5 to 50 Kg/dm². The positive active material is composed of a lead powder blended with anisotropic graphite in an amount of at least 0.1% of the weight of the lead powder. Preferably, the battery is assembled with unformed positive and negative plates into an assembled element, which is subsequently filled with an electrolyte and subjected to formation in a container.

5 Claims, 7 Drawing Figures

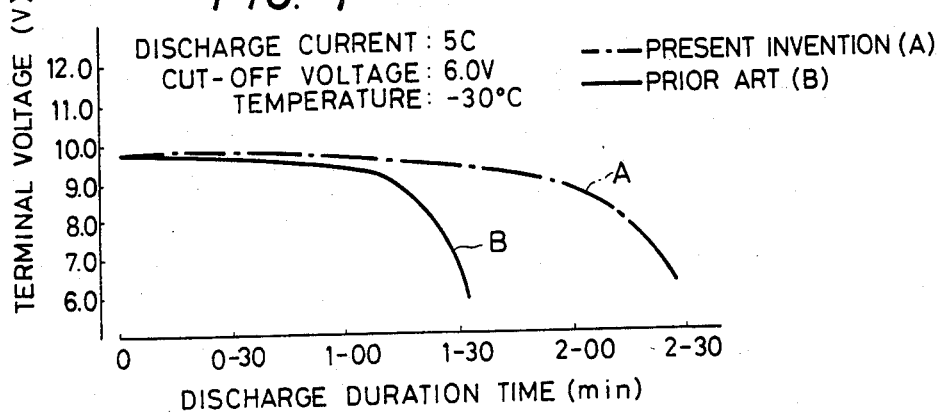
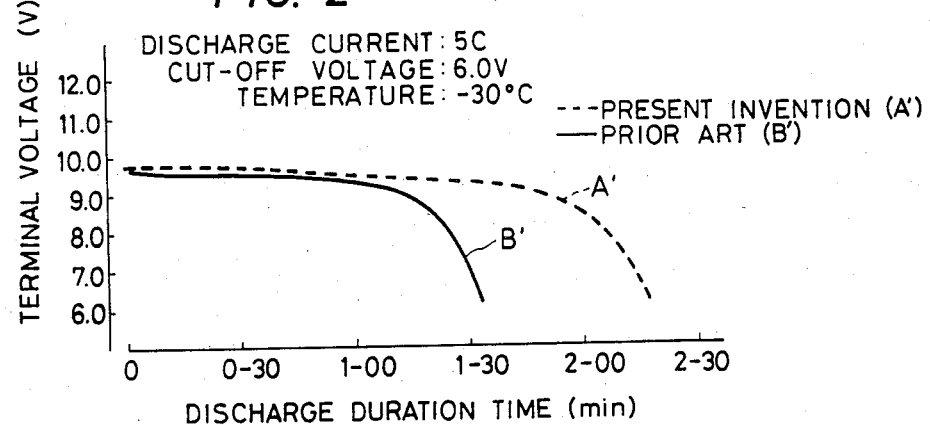
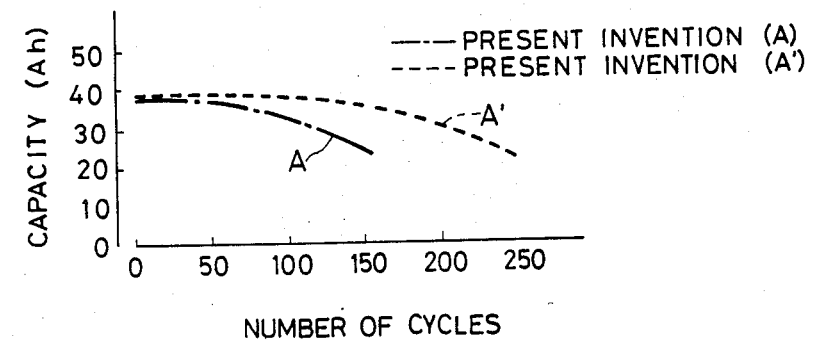

TEST CONDITIONS
DISCHARGE CURRENT : 3.4 x $I_{20}$
CHARGE VOLTAGE : 2.30V/cell
Imax: 6 x $I_{20}$
$I_{20}$:20hR CURRENT
TEMPERATURE : 20°C

RETAINER TYPE LEAD-ACID BATTERY

BACKGROUND OF THE INVENTION

The present invention relates to an improved retainer type lead-acid battery in which the electrolyte is impregnated and retained in the positive and negative active materials of the battery and in a porous separator, and which has no flooded electrolyte present.

Retainer type lead-acid batteries generally have poor high discharge rate performance at low temperatures in comparison with ordinary lead-acid batteries that have a sufficient supply of freely fluid electrolyte. In order to achieve high rate discharge satisfactorily, sulfate ions or hydrogen ions must quickly diffuse from the electrolyte into microscopic pores in the electrode plates. This requirement is satisfied fairly easily by ordinary lead-acid batteries having an ample supply of fluid electrolyte, but in the retainer type lead-acid batteries in which the electrolyte is impregnated and retained only in the positive and active materials and in the separator, the diffusion of the electrolyte to the electrode plates during discharge is so slow that a decrease in the battery's capacity often occurs.

The reason for this is as follows: The separator, which is made of very fine glass fibers and which has a high affinity for the electrolyte, has a porosity of no smaller than 90%, but on the other hand, the positive and negative materials have porosities of only 40 to 50% and their affinity for the electrolyte is fairly low, causing the electrolyte to be predominantly present in the separator. Additionally, no flooded electrolyte is present between the electrodes and the separator, increasing the chance of the occurrence of a gap therebetween, which gap retards the transport of the electrolyte from the separator to either electrode plate. This problem is particularly serious at the positive electrode plate where water formed during discharge (in accordance with the following reaction) blocks the transfer of sulfate and hydrogen ions:

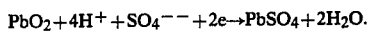

$$PbO_2 + 4H^+ + SO_4^{--} + 2e \rightarrow PbSO_4 + 2H_2O.$$

SUMMARY OF THE INVENTION

The present invention has been accomplished in order to eliminate these problems associated with the conventional retainer type lead-acid battery. In essence, the present invention provides a retainer type lead-acid battery in which the electrolyte is impregnated and is retained only in the separator and the positive and negative active materials, wherein the separator is comprised of glass fibers having an average diameter of up to 5.0 microns, and the battery is fabricated by applying a pressure of 5 to 50 kg/dm² to an assembled element laminated with electrode plates and the separator in the dry state prior to electrolyte filling, and by employing the positive active material composed of a lead powder blended with anisotropic graphite in an amount of at least 0.1% of the weight of the lead powder.

When a positive electrode plate containing anisotropic graphite is subjected to electrochemical forming, the graphite is oxidized to form an intercarlation compound between graphite and acidic sulfate salt, causing the positive electrode plate to expand in a given direction. As a result, the plate has an increased porosity and contains a greater amount of sulfuric acid in the active material than was previously possible. This allows for the effective utilization of sulfuric acid during discharging, and at the same time, the expanding plate urges itself against the separator and the resulting intimate contact between the two enables rapid diffusion of the electrolyte from the separator to the positive plate. Therefore, in accordance with the present invention, a retainer type lead-acid battery having a good high rate discharge capability is provided.

BRIEF DESCRIPTION OF THE DRAWINGS

FIGS. 1 and 2 are graphs showing discharge curves for two samples of a retainer type lead-acid battery in accordance with the present invention and conventional products;

FIG. 3 is a graph comparing the cycle lives of two samples of batteries in accordance with the present invention;

DESCRIPTION OF THE PREFERRED EMBODIMENTS

The following example are provided for further illustration of the inventive battery.

EXAMPLE 1

Two retainer type lead-acid batteries, A and B, were fabricated using a separator made of glass fibers having an average diameter of 0.7 microns and whose thickness was adjusted so that the assembled element in the dry state prior to electrolyte filling were urged against each other at a pressure of 20 kg/dm². Each battery had a nominal capacity of 36 amp-hours (5-h rate). Battery A was fabricated in accordance with the present invention by incorporating in the positive active material 0.5 wt%, based on lead powder, of an anisotropic graphite powder having an average particle size of 340 microns. Battery B was conventional and contained no anisotropic graphite in the positive active material. The two batteries were discharged at −30° C. at a discharge current of 5C amperes (C being the value of the nominal battery capacity). The discharge curves obtained are shown in FIG. 1, from which it can be seen that the battery in accordance with the present invention had a high discharge rate capability, namely, about 50% better than the performance of the conventional product. The effectiveness of the added anisotropic graphite was apparent.

EXAMPLE 2

In Example 1, the formation (charging) of the positive and negative plates was performed within an electrolyte-filled tank, and the formed plates were rinsed with water, dried and assembled with the separator to make a battery. In Example 2, dry positive and negative plates yet to be formed (charged) and a separator were placed in a container, with the thickness of the separator adjusted so that the assembled element were urged against each other at a pressure of 20 kg/dm². Subsequently, the formation (charging) of the plates was performed within the container. Battery A' of the present invention and battery B' undoped with anisotropic graphite were fabricated using the same configuration as employed in Example 1. The two batteries were discharged under the same conditions as in Example 1. From the obtained discharge curves shown in FIG. 2, it can be seen that battery A', although not as good as battery A, had a better high rate discharge performance than the conventional product. Batteries A and A' were subjected to life tests and, as shown in FIG. 3, battery A' had a longer cycle life.

Figure 4:
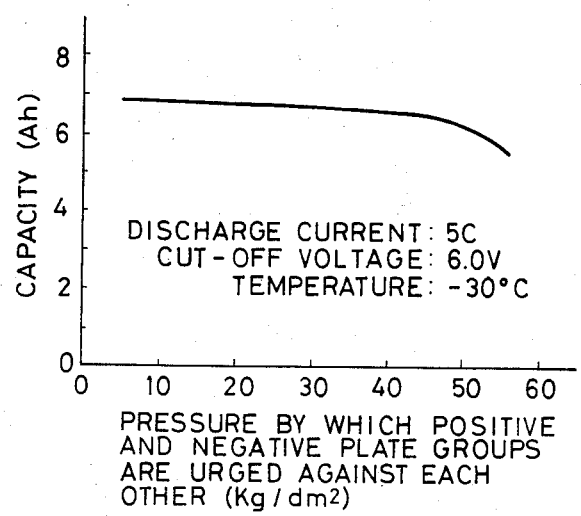
FIG. 4 is a graph showing the discharge ampere-hour capacity as a function of the pressure with which the electrode plates are pressed against each other.
Figure 5:
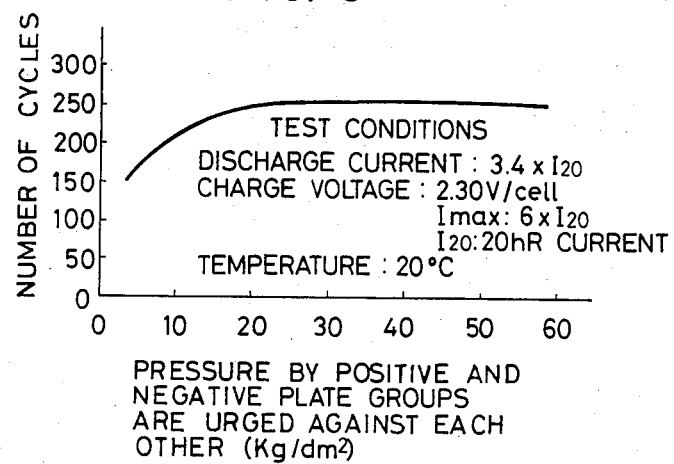
FIG. 5 is a graph showing the cycle life as a function of the pressure by which the electrode plates are pressed against each other.

A plurality of retainer-type lead-acid batteries were fabricated having an anisotropic graphite powder (average particle size of 340 microns) added to the positive active material as in Example 1. The thickness of the separator, which was made of chopped glass strands having an average diameter of 0.7 microns, was varied so as to change the degree of pressing dry plates against each other prior to electrolyte filling. The batteries were discharged at $-30°$ C. at a current of 5C amperes. A pressure vs. capacity curve was obtained as shown in FIG. 4. As can be seen therefrom, the capacity decreased with increasing pressure, and a considerable capacity loss occurred at pressures above 50 kg/dm². This is because at higher pressures the positive active material was not sufficiently expanded by the oxidized graphite to attain an increased porosity. The capacity increased as the pressure decreased, but reached a saturation point at 10 kg/dm², below which no further increase in capacity occurred. The cycle life as a function of the pressure by which dry plates were pressed against each other prior to electrolyte filling is shown in FIG. 5. As the pressure increased, a longer cycle life was obtained, but at 20 kg/dm², saturation occurred (250 cycles) and no further increase in the cycle life was attained at higher pressures. At pressures lower than 5 kg/dm², the life was as short as 150 cycles. This is because the positive active material incorporating the graphite swelled so greatly as to increase the chance of its dislodging from the grid. The data shown in FIGS. 4 and 5 indicate that in order to provide a high performance retainer type lead-acid battery having anisotropic graphite incorporated in the positive active material, the dry electrode plates prior to electrolyte filling should be urged against each other by a pressure of 5 to 50 kg/dm², with the range of 10 to 40 kg/dm² being particularly preferred.

Figure 6:
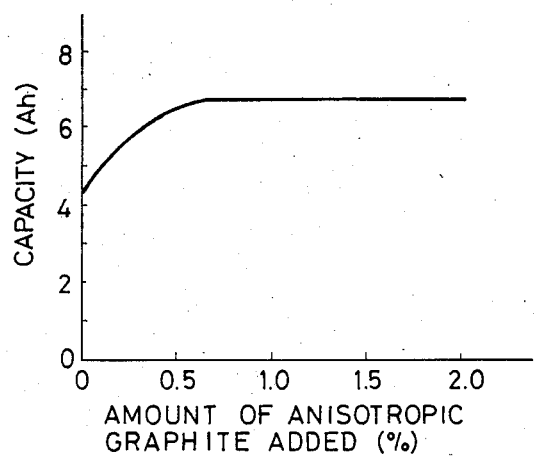
FIG. 6 is a graph showing the discharge ampere-hour capacity as a function of the amount of anisotropic graphite added to the positive active material.

A plurality of retainer type lead-acid batteries were fabricated by urging dry assembled element against each other at a pressure of 20 kg/dm² prior to electrolyte filling. Varying amounts of anisotropic graphite were incorporated in the positive active material and the batteries were discharged at $-30°$ C. at a current of 5C amperes. The results are shown in FIG. 6, from which it can be seen that the battery containing only 0.1 wt% of graphite had a greater discharge ampere-hour capacity than the control, but the effectiveness of graphite was most significant when it was added in amounts exceeding 0.3 wt%. No further increase in ampere-hour capacity was attained, even when graphite was added in amounts exceeding 1.0 wt%. In conclusion, the effectiveness of graphite was apparent when it was added in an amount of 0.1 wt%, but in order to obtain better results, graphite is preferably added in amounts of 0.3 wt% or more.

Figure 7:
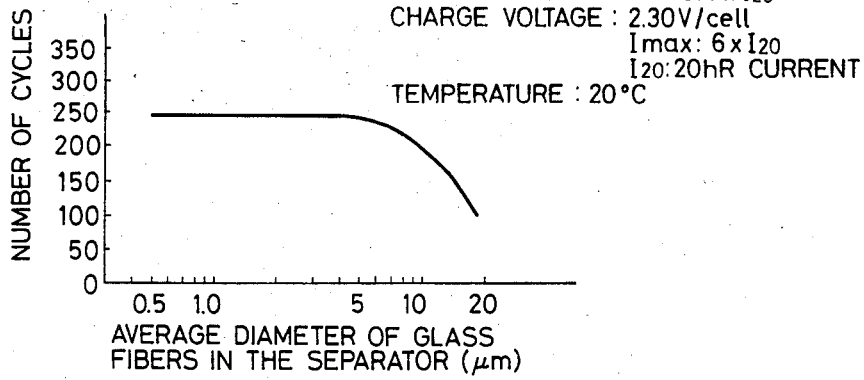
FIG. 7 is a graph showing the cycle life as a function of the average diameter of the glass fibers used in the separator.

A plurality of retainer type lead-acid batteries were fabricated by urging dry assembled element against each other at a pressure of 20 kg/dm² prior to electrolyte filling and by incorporating 0.5 wt% of anisotropic graphite in the positive active material. The average diameter of glass fibers in the separator was varied to examine the effects of this factor on the cycle life of the batteries. The results are shown in FIG. 7, from which it can be seen that the batteries using glass fibers with average diameters of not more than 5.0 microns were capable of about 250 discharge-charge cycles. Separators using fibers having average diameters greater than 5.0 microns had such large pores that when the positive active material incorporating anisotropic graphite swelled, it could easily penetrate the separator and cause a short-circuit failure or it would be shed from the grid, causing a shorter cycle life. Therefore, in order to maximize the effect of the addition of graphite, the separator is preferably made of glass fibers having an average diameter of not more than 5.0 microns.

As is shown in Example 2, for the purpose of maximizing the effect of the graphite addition it is preferred that an assembly of positive and negative plates sandwiched by a separator be subjected to formation within a container.

The retainer type lead-acid battery in accordance with the present invention uses a separator made of chopped glass strands having an average diameter of not more than 5.0 microns and is fabricated by an average diameter of not more than 5.0 microns and is fabricated by an average diameter of not more than 5.0 microns and is fabricated by urging dry assembled element against each other at a pressure of 5 to 50 kg/dm² prior to electrolyte filling and by incorporating anisotropic graphite in the positive active material in an amount of at least 0.1 wt% of lead powder. The battery so fabricated has a high rate discharge capability at low temperature that is much improved over the performance of the conventional retainer type lead-acid batteries.

I claim:

1. A retainer type lead-acid battery having an electrolyte impregnated and retained only in a separator and positive and negative active material, wherein said separator comprises glass fibers having an average diameter of no more than 5.0 microns, said battery being fabricated such that applied pressure to an assembled element in the dry state prior to electrolyte filling is kept at a pressure of 5 to 50 kg/dm², and wherein said positive active material is composed of a lead oxide powder blended with anisotropic graphite in an amount of at least 0.1% of the weight of the lead oxide powder.

2. The retainer type lead-acid battery according to claim 1, wherein said battery is assembled with unformed positive and negative plates, and subsequently filled with an electrolyte, and wherein said positive and negative plates are formed in a container of said battery.

3. The retainer type lead-acid battery according to claim 1, wherein said pressure is in a range of 10 to 40 kg/dm².

4. The retainer type lead-acid battery according to claim 1, wherein said anisotropic graphite is present in an amount of at least 0.3% of the weight of the lead oxide powder.

5. The retainer type lead-acid battery according to claim 1, wherein said glass fibers of said separator are made of chopped glass strands.

* * * * *